Feb. 22, 1938.  B. G. ALDRIDGE ET AL  2,109,125
PROCESS AND APPARATUS FOR DEWAXING OILS
Filed May 29, 1936  2 Sheets-Sheet 1
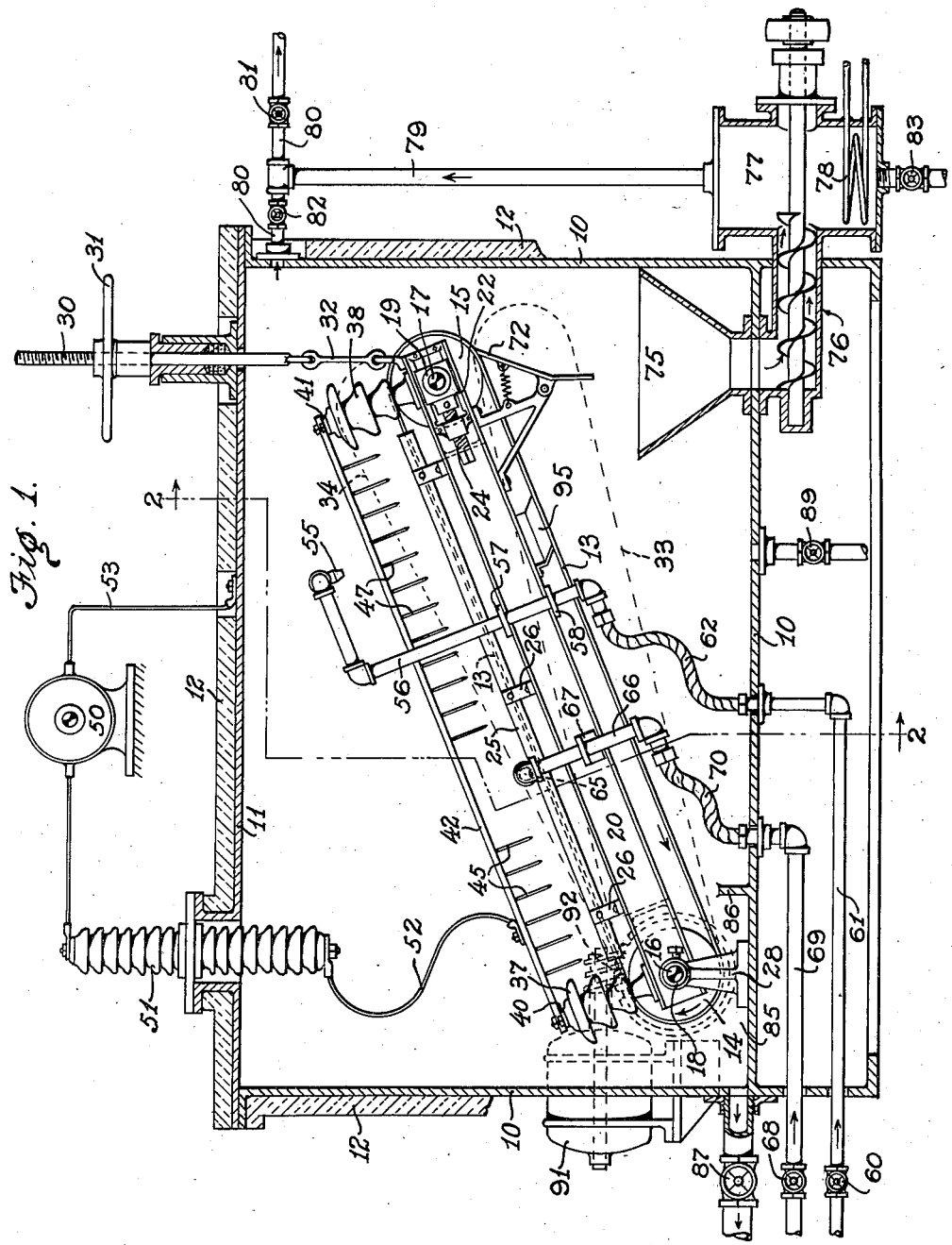
INVENTORS
Basil Hopper & Blair G. Aldridge
BY Philip Subkow
ATTORNEY.

Feb. 22, 1938.  B. G. ALDRIDGE ET AL  2,109,125
PROCESS AND APPARATUS FOR DEWAXING OILS
Filed May 29, 1936  2 Sheets-Sheet 2
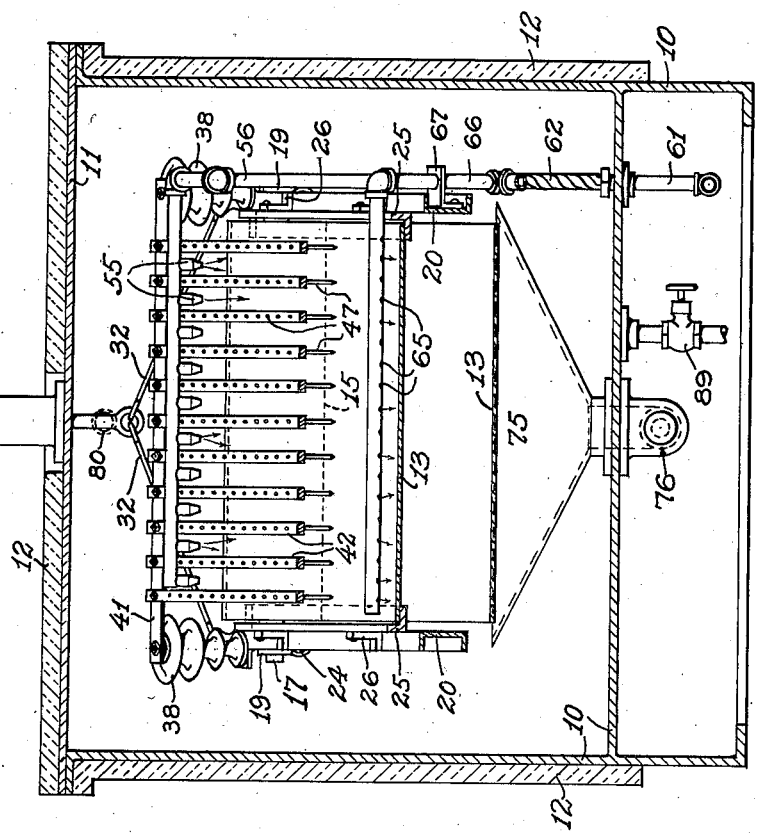
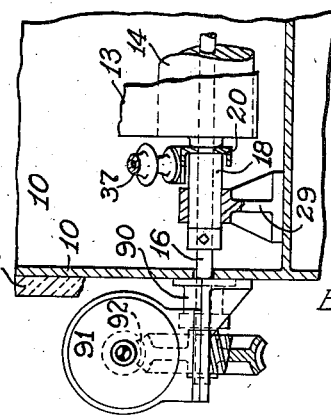
INVENTORS
*Basil Hopper & Blair G. Aldridge*
BY
*Philip Subkow*
ATTORNEY.

Patented Feb. 22, 1938

2,109,125

UNITED STATES PATENT OFFICE 2,109,125

PROCESS AND APPARATUS FOR DEWAXING OILS

Blair G. Aldridge, Los Angeles, and Basil Hopper, Palos Verdes Estates, Calif., assignors to Union Oil Company of California, Los Angeles, Calif., a corporation of California Application May 29, 1936, Serial No. 82,510

21 Claims. (Cl. 204—24)

This invention relates to the separation of precipitates from oils and particularly to the electrical separation of wax, asphalt, resin and the like substances from hydrocarbon oils.

Many oils, such as lubricating oil, fuel oil, motor fuel, and other similar oils which are derived from crude oils, contain paraffinic, waxy, asphaltic and resinous constituents, which may appear there by reason of having been present in the crude oil from which they were derived or by reason of their formation in intermediate treating processes such as distillation or cracking. The wax-like constituents which may thus be present limits the minimum temperature at which these oils can be used by solidifying or congealing at low temperatures. The asphaltic and resinous bodies also are objectionable for numerous other reasons well known in the art of lubricating oil and motor fuel refining. Therefore, in the refining of such oils, it is common practice to remove a substantial portion of these waxy, asphaltic and resinous constituents, in order to lower the pour points and improve the quality of such oils.

The separation of the undesirable paraffinic and waxy bodies from oil fractions has been accomplished in the past by several processes, the most common and oldest of which are the "cold settling process" and the "cold pressing process". These processes have been inefficient, time consuming and mechanically involved.

Asphaltic, resinous and tarry constituents and color bodies have been separated by well known processes employing acid, alkali, clay or other chemical treatment and recently by solvents. In the solvent process the oil containing the undesirable constituents such as asphalt, resin, color bodies and the like, is dissolved in a quantity of a suitable diluent such as liquid propane or other liquid normally gaseous hydrocarbon which has preferably, at normal temperature, low solvent power for these bodies, while at the same time retaining practically complete solvent power for the desirable fractions of the oil. Such solvent treatment results in the rejection of asphaltic bodies from the oil-diluent solution in the form of a relatively heavy insoluble precipitate or as a heavy liquid phase, a substantial portion of which may be separated from the oil solution by settling in a reasonable length of time. In this solvent process, however, a sufficient quantity of the precipitate material often remains in the oil solution in the form of an unsettled finely divided suspension to cause serious contamination of the final product unless special steps are taken for its complete removal.

Objects of this invention, therefore, are to overcome the disadvantages of the heretofore employed processes for the separation of wax, paraffin, asphaltic, tarry, resinous and color bodies from oils and to provide an improved process for the separation of these substances from oil which will be efficient, economical, of high capacity and rapid in action, and less costly in time and equipment than these processes heretofore employed. Another object of this invention is to provide a method wherein wax will be separated from wax-bearing oil which has been quickly cooled or "shock chilled", obviating batch chilling methods. Another object of this invention is to provide a process for separating wax from wax-bearing oil wherein an improved recovery of oil is accomplished resulting in the separation of wax having a lower oil content and a higher melting point than heretofore possible with cold settling and cold pressing methods. Other objects of the invention are to provide an improved process and apparatus for the efficient electrical separation of asphalt, resin, tar, color bodies and the like from oils.

In general, these objects are obtained according to the invention by subjecting the oil containing the suspended precipitate bodies to the action of an electric field.

Accordingly, the invention resides in an improved process and apparatus for the separation of suspended solids or precipitates from oils, wherein the oil containing the suspension is subjected to an intense ionizing electric field and the suspension separated from the oil by electrodeposition in a layer upon an electrode surface. The invention resides more specifically in a process and apparatus for the electrodeposition of the suspended precipitates from oils wherein the oil precipitate mixture is placed in the form of a relatively thin layer upon an inclined moving belt electrode and subjected there to an intense ionizing electric field whereby the precipitate is deposited and held in a dense layer upon the moving electrode surface, thus effecting the separation of the purified oil and the precipitate, and whereby the precipitated layer thus separated from the oil may be washed and further electrically treated to provide a dry, oil-free precipitate and a maximum recovery of purified oil. The invention also resides in a process and apparatus wherein the oil and the precipitate electrically deposited therefrom while under the influence of the electric field, move in a countercurrent relation. The invention also resides in apparatus wherein the said countercurrent flow of the treated constituents and other associated operating conditions can be readily controlled to obtain optimum treating efficiency.

This process is particularly adapted and finds one of its major industrial applications to processes for the removal of wax from oil. It is a particular advantage of the process that, in contradistinction to processes of settling, centrifuging or filtering, a careful preparation of the wax, that is as to crystal structure or plasticity, is avoided. In fact, all that is required is to separate the wax as a solid phase by chilling or otherwise precipitating it by reducing the solubility of the wax in the solvent or oil. We have found that the process works particularly well with flash chilled waxes, i. e. those waxes formed by such rapid chilling that the wax is in very finely divided condition.

Other objects, advantages and novel features of the invention will be evident hereinafter.

The accompanying drawings, of which Fig. 1 is a sectional elevation, Fig 2 is a cross section, taken at line a—a, and Fig. 3 is a fragmentary sectional view showing the drive mechanism, illustrate one embodiment of the invention with which the process of the invention may be performed.

The apparatus is as follows:

The main elements of the treater are housed within a vapor-tight shell 10 provided with a top 11 and a suitable surrounding heat insulating material 12. Inside of the container 10 is provided a movable metal belt electrode 13 extending between two rotatable metal drums 14 and 15 which are in turn rotatably supported upon shafts 16 and 17 extending through bearings 18 and 19 respectively. The belt electrode may be constructed of any suitable conducting material such as flexible metal webbing, or fabric suitably impregnated with conductive material such as sprayed or deposited metal or fabric belt covered with a metalic sheeting, but it is preferably constructed of a metallic conducting material having a smooth polished surface to facilitate the complete removal of deposited material. Such a belt electrode may be successfully constructed of non-annealed chrome nickel alloy steel sheets 0.01 inch thick and of any suitable width, with electrically welded lap joints. A rectangular channel iron frame 20 is provided for supporting and maintaining a proper separation and alignment of the said bearings 18 and 19. The bearings 18 for the lower drum 14 are attached to the channel iron frame in a fixed relationship, while the bearings 19 for the upper drum shaft are mounted at the upper end of the framework in the slotted guide supports 22 allowing there a limited degree of longitudinal motion, and tensioning screws 24 are provided for making such adjustments. The adjustment of screws 24 by forcing the bearings 19 carrying the drum shaft 17 outward along the guides, effects a tensioning adjustment on the metal belt 13 which extends between the said drums 14 and 15. A pair of angle irons 25 are provided at the edges of the upper portion of the belt electrode extending between the drums in such a position as to provide supports for the belt to prevent sagging and also to confine the layer of liquid to be treated to the top of the belt surface. These angle irons 25 are supported from the upper flanges of the channel irons by means of suitable angle clips 26.

The lower end of the rectangular frame 20 is rotatably supported about the lower drum shaft 16 upon supporting pedestals 28 and 29. The upper end of the said rectangular framework 20 is adjustably supported by means of the threaded shaft 30 and wheel 31, and the associated flexible linkages 32 whereby upon rotation of the wheel 30, the horizontal angular attitude of the frame 20 and the associated assembly can be adjusted from the outside of the shell during operation between limits as indicated by the dotted lines 33 and 34. The unthreaded portion of the shaft 28 of the adjusting mechanism passes through a stuffing box 35.

Standing at each of the four corners of the channel iron frame 20 at points substantially directly above each of the drum shaft bearings is a high tension insulator as indicated at 37 and 38. From the tops of the insulators is supported a substantially rectangular metallic gridwork comprising two transverse end bars 40 and 41 and a plurality of cross bars 42. From the lower sides of the cross bars 42 of the grid work a plurality of uniformly spaced pointed wire electrodes 45 and 47 extend toward and substantially perpendicular to the upper surface of the belt electrode. The electrode system which is supported upon the insulators and comprising the pointed electrodes 45 and 47 and the supporting gridwork members 40, 41 and 42 is maintained at a high electric potential difference with respect to the adjacent surface of the belt electrode by means of a suitable high potential generator 50 which is electrically connected thereto through the high tension lead-in insulator 51 and the flexible conductor 52. The opposite electrical circuit from the high potential generator 50 is completed to the belt electrode by way of the ground connection 53 through the container 10 and the metallic belt electrode supporting mechanism.

A plurality of nozzles 55 are positioned above the upper portion of the electrode system so that fluid supplied thereto will jet downward through the electric field and impinge upon the upper portion of the belt electrode surface. These nozzles are supported and supplied with fluid through the connecting piping 56 which is suitably attached to the frame 20 by clips 57 and 58 so that the relative position of the jets and the electrodes will not change with adjustment of the angular position of the apparatus within the container. Fluid is supplied to the said nozzles through valve 60, pipe 61, and through the flexible connection 62. Another series of nozzles 65 is provided extending across the upper surface of the metal belt at an intermediate point. This series of nozzles is also supported by means of the connecting piping 66 which is rigidly attached to the frame 20 by the angle clip 67 and fluid is supplied through valve 68, pipe 69 and flexible connection 70.

The connections 62 and 70 are preferably constructed of flexible metallic tubing.

A scraper 72 bears across the width of the metallic belt 13 at the lower side of the drum 15 and serves to remove deposited material adhering to the belt surface. A hopper 75 having a rectangular shaped top opening is provided in the bottom of the enclosure 10 directly underneath the scraper 72 to receive deposited material removed from the belt and to guide this material into the screw conveyer 76, by means of which it is removed from the treater and introduced into the accumulator 77. A heating coil 78 serves to introduce heat into the bottom of the accumulator.

Another scraper 95 bears diagonally across the inside lower surface of the belt electrode and serves to maintain that surface of the belt which passes over the roller drums, free from undesirable deposits.

Pressure equalizing lines 79 and 80 are provided between the upper portion of the container 10 and the accumulator 77 and a branch connection 80 and valve 81 are provided for venting gases from the treater shell and accumulator to the vapor recovery system.

In the opposite end of the container 10 and directly beneath the lower end of the belt and the drum 14, is provided a rectangular reservoir 85 formed by means of dam 86 for collecting liquids which have been treated on the belt electrode and which drain therefrom at this point. Provision is made for withdrawing liquids from the reservoir 85 through outlet valve 87. Provision is also made for draining extraneous accumulated liquids and condensate from the tank bottom through valve 89.

The shaft 16 upon which the lower drum 14 rotates, extends out through a stuffing box 90 in the side of the shell 10 and power is transmitted through this shaft from a variable speed motor 91 and through suitable gearing 92 for rotating the drums and moving the belt electrode at a suitable speed.

The herein described apparatus is adapted to perform the process of electrically separating precipitates and solids from oils in general. It is particularly adapted to separate wax, asphalt and color bodies from lubricating oils; waxy, resinous and colored bodies from gasoline and Diesel fuel oil; asphaltic and carbonaceous substances from residuums; and tars from coal tar oils and the like. It is also adaptable to the separation of spermacite, stearin, olein, palmitin, arachidin, elaidin and other high melting point fats and their acids from animal or vegetable oils containing them. These fats or fatty acids may be precipitated preparatory to the electrical separation by chilling and/or by means of diluents or antisolvents. Fatty oil to be freed from stearin for example such as cottonseed oil, is diluted with a light volatile hydrocarbon fraction and chilled either directly by evaporation of a portion of the diluent or indirectly by heat exchange with a suitable refrigerant, to precipitate the stearin in the form of finely divided solid particles, and the subsequent separation of the stearin and the thus treated cottonseed oil accomplished electrically according to the process described herein.

Since the processes and operation of the apparatus for the separation of any one of these substances from oil is similar, the following typical operation as applied to electrical dewaxing of wax-bearing oil, for example, is given:

The wax precipitate may be formed in the wax-bearing oil preparatory to the electrical dewaxing process either by chilling in the presence of a suitable diluent by indirect heat exchange with a suitable refrigerant; or it may be formed by direct internal refrigeration in the presence of a liquid normally gaseous diluent such as propane. The wax precipitate is preferably formed by the latter self-refrigeration method wherein the wax-bearing oil liquid propane solution is continuously flashed into a region of low pressure, accompanied by the rapid evaporation of a portion of the propane and the resulting sudden chilling and precipitation of the wax in the remaining oil-propane solution. Rapid chilling such as this is known as flash chilling or shock chilling and apparently results in the formation of a finer wax precipitate than is formed by slower cooling methods. The formation of such fine precipitates is advantageous in the electrical dewaxing process.

The wax-bearing oil mixture carrying precipitated wax preferably thus formed by flash chilling the oil in the presence of a volatile diluent such as propane, is introduced into the apparatus 10 through valve 68, pipe 53, flexible tubing 70, pipe 66 and placed in the form of a thin layer upon the upward moving surface of the metallic belt electrode 13 by means of the plurality of nozzles 65 extending laterally thereacross. The horizontal slope of the belt electrode is adjusted by means of the wheel 31 and the rate of the waxy oil propane feed to the belt surface is regulated by valve 68 whereby they together maintain flow conditions which will permit the applied wax-bearing oil propane mixture layer to move downward at a suitable velocity under the influence of gravity over the upward moving surface of the belt to reach the lower end thereof and to drop into the dewaxed oil accumulating reservoir 85. During this downward flow over the upward moving belt surface, the applied wax-bearing oil layer is subjected to the intense ionizing electric field from the lower bank of the adjacent pointed electrodes 45, which results in the progressive deposition of the wax particles from the said downward flowing waxy oil layer in the form of a dense coating upon the said upward moving belt surface. The dewaxed oil solution from which the wax has thus been removed, flows downward and drops from the lower end of the moving belt at the point where it passes around the drum 14 and is accumulated in the dewaxed oil reservoir 85. From here the dewaxed oil-propane solution is withdrawn through valve 87. It is apparent here at this stage of the process that the oil and the electrically deposited wax layer upon the depositing electrode surface move countercurrent to one another, and it is an important feature of this invention that such controlled countercurrent treatment of the oil and the electrode carrying the deposited wax is performed by this apparatus. As a result of this countercurrent relative motion, the wax-bearing oil which is most free of precipitated wax, as it flows down over the belt surface in the treating field, is constantly brought into contact with upward moving clean electrode surfaces, which results in the most efficient removal of wax from the oil.

It is also an important feature and advantage of this invention that the treatment is performed upon an adjustable, uniformly sloping surface, whereby proper control can be easily maintained over the feed rate, thickness of the layer of oil being treated upon the sloping electrode surface, rate of flow or run-off of the said oil layer, and the rate of upward motion of the belt electrode, in mutual accommodation to the electrical treating rate and film flow velocity.

As the deposited wax layer in its continued upward movement upon the belt reaches a point above the feed nozzles 65, it is again subjected to an intense ionizing electric field from the upper bank of the pointed ionizing electrodes 47 to effect the removal of additional included oil and solvent. While we do not wish to limit ourselves to any theory of action, we believe that in part the drying action of the field on the wax is due to electrical endosmosis which draws the oil to the surface of the wax and permits its runoff and removal by wash propane. As the deposited wax further continues its upward travel upon the moving belt electrode it is subjected to a washing jet of cold liquid propane issuing through the electric field from nozzles 55. The propane jet is preferably of sufficient intensity to penetrate and in effect to thoroughly scrub the deposited wax layer at the point of its impingement. The forceful introduction of the jet of wash propane at a point above the pointed electrodes so that it passes through the electric field before impinging upon the deposited wax layer upon the belt electrode surface is believed to add effectiveness to the washing and deoiling process. In contradistinction to this, it is observed that wash propane which is placed at low velocity upon the deposited wax layer from nozzles close to the belt surface and in a substantially weakened electric field and has a tendency in its downward flow to channel or flow around the edges or boundaries of the adjacent electric field patterns formed on the belt surface under the ends of the pointed electrodes, thereby avoiding proper washing contact with a large proportion of the wax layer. As the washed wax layer continues upward from the washing zone in its movement with the belt electrode the electrical treatment is continued under the electrodes 47 to remove the added wash oil and additional quantities of included oil which was freed by the scrubbing action of the wash propane. This results in a higher recovery of dewaxed oil and a final wax which has a greater degree of freedom from oil. The oil and diluent solution electrically withdrawn from the wax layer together with the added wash oil from the nozzles 55 runs downwardly over the wax layer upon the belt surface and finally commingles with the wax-bearing oil feed issuing from the nozzles 65.

The deposited wax layer which has been deposited, washed and electrically treated for the removal of the included oil and diluent is finally removed from the belt electrode surface by means of the scraper 72 and dropped into the hopper 75 from which it is withdrawn by means of the screw conveyer 76. The wax withdrawn from the hopper 75 by means of the screw conveyer 76 is introduced into the wax accumulator 77 where, in contact with the heating coil 78, it is freed of the remnants of the liquid propane diluent and melted, enabling it to be withdrawn as a liquid wax through the wax outlet 83. The evaporated propane vapors from the wax are withdrawn through the line 79, 80 and valve 81 and conducted to the propane recovery system.

Valve 82 serves to maintain a slight excess of pressure in the treater shell over that in the said wax accumulator 70 and the venting system pipes 79—80, thereby insuring the exclusion of hot propane vapors from the inside of the treater shell.

While the electrical dewaxing apparatus which is housed in the shell 10 is provided with an effective heat insulating material 12, yet the small amount of heat finding its way from the outside into the treater through the insulated walls will necessitate the evaporation of an appreciable quantity of propane diluent within the container 10 in order to maintain the desired low operating temperatures. The vapors resulting from this evaporation are also withdrawn through line 80 and valve 81 to the propane recovery system.

Since the internal temperature of the dewaxing apparatus is dependent upon the pressure therein when employing liquid normally gaseous diluents such as propane, the temperature is conveniently regulated by valve 81. For example, if it is desired to carry on the electrical dewaxing process by the hereinbefore described apparatus at a temperature of approximately —40° F., valve 81 will be regulated so that the pressure within the container 10 is approximately atmospheric. If, however, the electrical dewaxing is desired to be carried on at higher temperatures, for example at approximately —30° F., the valve 81 will be regulated so as to maintain a pressure within the container 10 of approximately 2 or 3 pounds per square inch gauge.

In the operation described, employing propane diluent, the treater operates in an atmosphere of propane vapor confined within the shell. When other volatile diluents are employed the atmosphere within the treater shell will consist of vapors of such diluents. The process is not limited, however, to the use of volatile diluents, certain substantially non-volatile diluents such as kerosene, gas oil and medium heavy hydrocarbon fractions being frequently employed under some conditions. Moreover, in the treatment of light oils such as Diesel fuel oil, diluents are at times unnecessary, such oils inherently having sufficient fluidity at low temperatures. The character of the gaseous atmosphere maintained within the treater shell, although having some bearing thereupon, is not of primary importance insofar as the electrical ionization effects of the electric treating fields are concerned, it only being necessary to avoid inflammable gaseous mixtures. For this reason, precaution is taken to prevent infiltration of air into the treater shell, and therefore, when non-volatile but inflammable liquid mixtures are being treated it is desirable to supply an inert oxygen-free atmosphere of gas such as fuel gas, flue gas, or carbon dioxide.

Any condensate or splashed materials which may reach the bottom of the container 10 are withdrawn continuously or periodically through the drain valve 89.

The electrodes 45 and 47 are constructed of pointed wires which may be approximately $\frac{1}{16}$ to $\frac{1}{8}$ of an inch in diameter and approximately 12 inches long, and they are supported at their upper ends from the supporting gridwork 40—42 with their axes perpendicular to the upper surface of the belt electrode. These pointed electrodes are preferably spaced from one another at distances of from 1 to 2 inches on centers. The lower ends of the pointed electrodes are uniformly spaced from the upper surface of the belt electrode and adjusted at a distance just sufficient to prevent continuous spark-over therebetween at the operating potentials. Operating potentials which have been found to effect efficient dewaxing of the oil were in the neighborhood of 50,000 to 100,000 volts and under these conditions of voltage and electrode spacing a silent electric discharge or corona is observed between the ends of the electrodes 43 and the surface of the belt electrode upon which the wax-bearing oil to be treated is flowed. Under these potentials and under conditions where the silent discharge and corona occur the phenomenon is manifested as an electrical windage blowing from the electrode of smallest area toward the electrode of relatively larger area. This ionizing phenomenon is herein referred to as "electrical windage". The electric potential applied to the electrodes by means of the generator 56 is preferably unidirectional and of a constant potential whereby the maximum average potential may be maintained between the electrodes without spark-over. The electrodes 45—47 are also preferably maintained at the negative polarity.

An example of a typical operation of the hereinbefore described process and apparatus for dewaxing oil is shown in Table I.

TABLE I

Material treated:—*Mixture of Santa Fe Springs and Kettleman Hills Lubricating Oil Stock*

Operating conditions:
| | |
|---|---|
| Propane-oil ratio to treater jets (65)* | 2.6 |
| Shock-chilled waxy oil feed rate to jets, gal./hr | 16.0 |
| Wash propane to jets (55), gal./hr | 10.0 |
| Belt electrode speed, ft./min | 12.5 |
| D. C. potential between electrodes kv. (45–47, 13) | 57.5 |
| Current to electrodes—milliamperes | 3.9 |
| Polarity of ionizing electrodes (45–47) | neg. |

Temperatures:
| | |
|---|---|
| Flash chilled wax-bearing oil to jets (65), °F | −29.8 |
| Inside of treater—average, °F | −27.5 |
| Wash propane to jets (55), °F | −26.3 |

Pressures:
| | |
|---|---|
| Chilled oil manifold to jets (66), lbs./sq. in. ga | 5.3 |
| Treater shell, lbs./sq. in. ga | 1.6 |

Commodities data:
Feed material (untreated)
| | |
|---|---|
| Gravity, °A. P. I | 22.4 |
| Pour point, °F | 95.0 |
| Viscosity at 130° F., S. S. U | 160.0 |

Electrically dewaxed oil (treated)
| | |
|---|---|
| Gravity, °A. P. I | 20.0 |
| Pour point, °F | 0 |
| Viscosity at 130° F., S. S. U | 245 |
| Yield percent | 82.2 |

Wax electrically removed from oil
| | |
|---|---|
| Gravity, °A. P. I | 32.8 |
| Melting point | 119.0 |
| Oil content, percent | 23 |

*Numbers in parenthesis refer to reference characters on drawings.

The hereinbefore described apparatus and process is not only applicable to the separation of wax from oil, as described by way of illustration, but is applicable to the separation of asphalt, resin, fats, color bodies, carbonaceous matter and the like precipitatable substances and solid suspensions from oils or liquids in general, it being only necessary to effect a prior precipitation of the substances to be separated after which the electrical treatment is performed by the apparatus in a manner similar to that described in connection with the electrical dewaxing process. Chilling has been described as the specific method for preparing wax-bearing oil to be electrically dewaxed by the described process and apparatus of this invention, but obviously other appropriate preparatory methods would be employed for the separation of other substances, such preparatory methods being dependent upon the character of the materials. For example in the separation of asphaltic constituents from asphalt-bearing oil, as hereinbefore briefly described, the asphalt may be precipitated usually at normal temperatures by the addition of a suitable solvent such as liquid propane, or other liquid normally gaseous hydrocarbons, as is now well known in the solvent deasphalting art. After thus effecting the precipitation of asphalt, that portion of the oil which carries finely divided asphalt precipitate in suspension is fed to the electrical treater and electrically separated from the oil in a manner similar to that described in connection with the described dewaxing operations.

The foregoing is merely illustrative of the apparatus and process of the invention and is not intended to be limiting. The invention includes any method and apparatus which accomplishes the same within the scope of the claims.

We claim:

1. A process for removing precipitated matter from liquids comprising flowing a film of said liquids over the surface of a depositing electrode and establishing an electric field between said depositing electrode and a second ionizing electrode substantially surrounded by a gaseous medium and which is directed toward the surface of said depositing electrode, said electric field being of sufficient intensity to produce an electrical windage impinging upon said film whereby precipitated matter in said liquid is deposited on said depositing electrode and movng said depositing electrode surface in a direction countercurrent to the flow of said liquid film.

2. A process for dewaxing oil comprising applying a mixture of oil containing precipitated wax to an inclined electrode surface whereby the thus applied waxy oil flows downward over the electrode surface in the form of a layer under the influence of gravity, moving said inclined electrode upward in a direction of its extended plane and countercurrent to said downwardly flowing waxy oil, establishing an electric field between said depositing electrode and a second ionizing electrode substantially surrounded by a gaseous medium and which is spaced from said layer of oil and directed toward the surface of said depositing electrode, said electrode field being of sufficient intensity to produce an electrical windage impinging upon said oil layer whereby wax is deposited from the oil in the form of a dense layer upon said electrode surface and moves countercurrent to and separates from said oil layer, subjecting said separated wax layer on the upward moving electrode surface to a forceful liquid spray to scrub the said deposited wax layer and to remove included oil therefrom and removing the scrubbed wax layer from said inclined electrode surface.

3. A process for removing precipitated matter from oils comprising flowing a film of said oils over the surface of a depositing electrode and establishing an electric field between said depositing electrode and a second ionizing electrode substantially surrounded by a gaseous medium and which is directed toward the surface of said depositing electrode, said electric field being of sufficient intensity to produce an electrical windage impinging upon said film whereby precipitated matter in said oil is deposited on said depositing electrode and moving said depositing electrode surface in a direction countercurrent to the flow of said oil film.

4. A process for removing precipitated wax, resin, asphalt and the like precipitated substances from oils which comprises flowing a film of said oil over the surface of a depositing electrode and establishing an electric field between said depositing electrode and a second ionizing electrode substantially surrounded by a gaseous medium and which is directed toward the surface of said depositing electrode, said electric field being of sufficient intensity to produce an electrical windage impinging upon said film whereby wax, resin, asphalt and the like precipitated substance in said oil is deposited on said depositing electrode surface and moving said depositing electrode surface in a direction countercurrent to the flow of said oil film.

5. A process for removing wax from oils which comprises flowing a film of said oil containing solidified wax over the surface of a depositing electrode and establishing an electric field between said depositing electrode and a second ionizing electrode substantially surrounded by a gaseous medium and which is directed toward the surface of said depositing electrode, said electric field being of sufficient intensity to produce an electrical windage impinging upon said film whereby wax in said oil is deposited on said depositing electrode surface and moving said depositing electrode surface in a direction countercurrent to the flow of said oil film.

6. A process according to claim 5 in which the deposited wax on said moving electrode surface is subjected to a liquid wash at a point beyond the point of application of said film of oil.

7. A process for removing precipitated matter from oils comprising flowing a film of said oil over the downwardly sloping surface of a depositing electrode and establishing an electric field between said depositing electrode and a second ionizing electrode substantially surrounded by a gaseous medium and which is directed toward the surface of said depositing electrode, said electric field being of sufficient intensity to produce an electrical windage impinging upon said film whereby precipitated matter in said oil is deposited on said depositing electrode and moving said depositing electrode upward in a direction countercurrent to the flow of said oil film.

8. A process for dewaxing oil comprising applying a stream of wax-bearing oil containing solidified wax to form a layer flowing along a surface of a depositing electrode, subjecting the same to an electric field to deposit wax upon said surface, moving said surface together with the deposited wax in a direction countercurrent to the flow of the wax-bearing oil layer, washing said deposited wax to remove occluded oil at a point beyond the zone of application of said wax bearing oil and permitting the wash liquid containing removed oil to commingle with the flowing layer of wax-bearing oil.

9. A process according to claim 2 in which the forceful liquid spray is introduced through a portion of the said electric field.

10. A process according to claim 2 in which the deposited wax layer removed from the oil layer while undergoing washing is simultaneously subjected to an ionizing electric field.

11. A process for removing wax from suspension in oil comprising subjecting a body of oil containing wax in suspension to the influence of an electric field and thereby depositing the wax in a layer upon an electrode surface, removing the deposited wax from the major portion of the oil from which it was deposited, subjecting the deposited wax layer on a depositing electrode surface to washing with a quantity of wash solvent applied in the presence of an ionizing electric field between said depositing electrode and an ionizing electrode substantially surrounded by a gaseous medium and which is directed toward the surface of said depositing electrode, said field being of sufficient intensity to produce an electrical windage impinging upon said wax layer, whereby occluded oil is removed from said wax layer, and removing the thus treated wax layer from the depositing electrode surface.

12. A process according to claim 11 with continued electric treatment of the wax layer with the said ionizing electric field, subsequent to the washing and prior to its removal from the electrode surface whereby additional occluded wash solvent and oil is removed from the said wax layer.

13. A process according to claim 11 in which the wash solvent is applied to the deposited wax layer in a stream passing through a portion of the said ionizing electric field.

14. A process according to claim 11 with commingling of the said applied wash solvent with the said body of oil containing wax in suspension from which the wax layer is deposited.

15. A process according to claim 11 with continued subjection of the washed wax layer to an ionizing electric field subsequent to the application of the wash solvent to remove additional occluded wash solvent and oil from the wax layer and commingling the said applied wash solvent with the said body of oil containing wax in suspension from which the wax layer is deposited.

16. Apparatus for removing solids in suspension from liquids comprising a moving depositing electrode having an inclined plane surface, another live electrode adjacent to and directed toward said inclined surface, means to maintain a high electric potential difference between said electrodes, means to place liquid carrying solids in suspension in a layer upon said inclined electrode surface without prior contact with the oppositely charged electrode whereby it is subjected to the electric field between the said electrodes and solids are deposited and means to remove the deposited solids from the surface of said inclined electrode.

17. Apparatus for removing matter in suspension from liquids comprising a depositing electrode having an inclined plane surface, another electrode adjacent said inclined depositing electrode surface, means to maintain a gas space between said electrodes, means to maintain a high electric potential difference between said electrodes, means to place liquid carrying matter in suspension in a layer upon said inclined depositing electrode surface whereby it is subjected to the electric field extending through said gas space between said electrodes and whereby suspended matter is deposited in a layer upon said depositing electrode, means to remove deposited matter from the surface of said inclined electrode surface and means to adjust the inclination of the plane surface of the said depositing electrode whereby the rate of flow and thickness of the applied liquid layer on the depositing electrode surface can be controlled.

18. Apparatus for removing solids in suspension from liquids comprising an inclined belt-shaped electrode movably supported between rotatable drums, another electrode adjacent said belt-shaped electrode surface, means to maintain a gas space between said electrodes, means to maintain a high electric potential difference between said electrodes, means to place liquid carrying solids in suspension in a layer upon said belt-shaped electrode surface whereby it is subjected to the electric field extending through said gas space between said electrodes and whereby solids are deposited in a layer upon said depositing electrode, means to move the belt-shaped electrode whereby deposited solids are carried through the electric field between the electrodes, means to remove the deposited solids from the moving belt-shaped electrode surface and means to adjust the inclination of the belt-shaped electrode surface whereby the rate of flow and the thickness of the applied liquid layer on the surface of the belt-shaped electrode can be controlled.

19. Apparatus for dewaxing oil comprising a rectangular frame, drums rotatably supported at each end of said frame, a metallic belt electrode extending between said rotatable drums, means to rotatably support said rectangular frame at one end, means to adjustably support said rectangular frame at the opposite end whereby the inclination of the metallic belt electrode may be varied, means to place wax-bearing oil in a layer upon the upper surface of said metallic belt electrode, means to withdraw oil from a point adjacent said lower rotatable drum and means to remove wax from the surface of said belt electrode at a point adjacent said upper rotatable drum.

20. Apparatus for dewaxing oil comprising a depositing electrode having an inclined plane surface, another adjacent electrode having a plurality of ionizing points directed toward said depositing electrode surface and substantially surrounded by a gaseous medium, means to maintain a high electric potential difference between said electrodes whereby an electrical windage is generated which impinges upon said depositing electrode surface, means to flow wax-bearing oil in a layer down said inclined depositing electrode surface whereby it is subjected to said electrical windage and wax is deposited, and means to move said inclined depositing electrode surface together with deposited wax in a direction counter-current to said downwardly flowing wax-bearing oil layer.

21. Apparatus according to claim 20 where the said means to flow wax-bearing oil in a layer is out of electrical contact with the ionizing electrodes.

BASIL HOPPER.
BLAIR G. ALDRIDGE.